United States Patent
Miyata et al.

(10) Patent No.: US 7,298,774 B2
(45) Date of Patent: Nov. 20, 2007

(54) ADAPTIVE ARRAY DEVICE, ADAPTIVE ARRAY METHOD AND PROGRAM

(75) Inventors: Takeo Miyata, Gifu (JP); Yoshiharu Doi, Gifu (JP); Masashi Iwami, Anpachi-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 854 days.

(21) Appl. No.: 10/362,647

(22) PCT Filed: Aug. 27, 2001

(86) PCT No.: PCT/JP01/07299

§ 371 (c)(1),
(2), (4) Date: Aug. 4, 2003

(87) PCT Pub. No.: WO02/17432

PCT Pub. Date: Feb. 28, 2002

(65) Prior Publication Data

US 2004/0048581 A1 Mar. 11, 2004

(30) Foreign Application Priority Data

Aug. 25, 2000 (JP) .............................. 2000-256526
Aug. 25, 2000 (JP) .............................. 2000-256527

(51) Int. Cl.
*H04B 1/00* (2006.01)
*H03H 7/30* (2006.01)

(52) U.S. Cl. ...................... 375/147; 375/232

(58) Field of Classification Search ................ 375/140, 375/147, 130, 224, 227, 228, 229, 230, 231, 375/232, 233, 377

See application file for complete search history.

(56) References Cited

U.S. PATENT DOCUMENTS 6,240,133 B1 *  5/2001  Sommer et al. ............. 375/232
6,490,007 B1 * 12/2002  Bouillet et al. ............. 348/614
6,563,880 B1 *  5/2003  Hunsinger et al. .......... 375/260

(Continued)

FOREIGN PATENT DOCUMENTS

EP  0 949 769  10/1999

(Continued)

OTHER PUBLICATIONS

Jinkuan Wang and Tadashi Takano, "Investigation on Adaptive Antennas Using a Kalman Filter", IEICE Transaction vol. J75-B-11, No. 11, Nov. 1992, (w/Verification of Translation).

(Continued)

*Primary Examiner*—Pankaj Kumar (57) ABSTRACT

An adaptive array apparatus (100) that has a weight converge on an optimal value is provided. The adaptive array apparatus repeatedly adjusts the weight using predetermined calculations so as to minimize a difference between a desired signal and a combined signal which has been weighted with the weight. A parameter control unit (71) judges whether an adjusted weight is located closer to an optimal value than a reference value, and according to the judgment result, changes a step size which is used in the predetermined calculations performed by a reception weight calculating unit (72), to determine the extent to which the weight should be adjusted. With this construction, the adaptive array apparatus can increase convergence stability and speed in calculating a weight, and the weight converges on an optimal value.

14 Claims, 6 Drawing Sheets

U.S. PATENT DOCUMENTS

| | | | |
|---|---|---|---|
| 6,590,532 B1 * | 7/2003 | Ogawa et al. | 342/378 |
| 2001/0046270 A1 * | 11/2001 | Uchiki et al. | 375/341 |
| 2002/0032015 A1 * | 3/2002 | Kitakado et al. | 455/277.1 |

FOREIGN PATENT DOCUMENTS

| | | |
|---|---|---|
| JP | 01-194613 | 4/1989 |
| JP | 11-052988 | 2/1999 |
| JP | 11-127137 | 11/1999 |
| JP | 2000-188568 | 4/2000 |
| JP | 2000-188568 | 7/2000 |

OTHER PUBLICATIONS

Nobuyoshi Kikuma, "Adaptive Signal Processing Using Array Antennas", Sep. 1998.

Ahmed I. Sulyman, Azzedine Zerguine, Convergence and Steady-State Analysis of a Variable Step-Size NLMS Algorithm, Signal Processing, Amsterdam, NL vol. 83, NR. 6, pp. 1255-1273.

Buckflew et al., Weak Convergence and Local Stability Properties of Fixed Step Size Recursive Algorithms, IEEE Transactions on Information Theory, IEEE Inc., New York, US, vol. 39, No. 3 May 1, 1993, pp. 966-978.

* cited by examiner

FIG.5A $$P(0) = \begin{pmatrix} 13 & 27 & 82 & 41 \\ 48 & 79 & 63 & 32 \\ 72 & 35 & 62 & 55 \\ 66 & 24 & 27 & 93 \end{pmatrix}$$

FIG.5B $$P'(0) = \begin{pmatrix} 113 & 27 & 82 & 41 \\ 48 & 179 & 63 & 32 \\ 72 & 35 & 162 & 55 \\ 66 & 24 & 27 & 193 \end{pmatrix}$$

ADAPTIVE ARRAY DEVICE, ADAPTIVE ARRAY METHOD AND PROGRAM

TECHNICAL FIELD

The present invention relates to an adaptive array apparatus that performs SDMA using an adaptive array method.

BACKGROUND ART

With the recent increase in the number of subscribers for mobile communication services, the expansion of the capacity of cells covered by each wireless base station has been demanded. One of the multiple access technologies that will help solve this problem is a technology called Space Division Multiple Access, or "SDMA" for short.

SDMA is a method used by a wireless base station to communicate with each of a plurality of mobile stations at the same timeslot and frequency, by dividing a communication space. The division of the communication space is realized when the wireless base station forms an optimum directivity pattern separately for each individual mobile station. A directivity pattern shows the direction in which signals are transmitted or received, and the intensity at which those signals are transmitted or received.

The wireless base station is equipped with an adaptive array apparatus as a device for forming directivity patterns. The adaptive array apparatus is chiefly composed of a plurality of antennas and a DSP (Digital Signal Processor), and forms any directivity patterns freely by weighting with particular values the amplitude and phase of each signal transmitted or received by each antenna. The adaptive array apparatus then performs transmission and reception of signals using the formed patterns. Hereafter, a value used for weighting is referred to as a weight signal, and a set of weight signals for forming a directivity pattern is referred to as a weight vector.

The adaptive array apparatus forms an optimal directivity pattern for a mobile station, by tracking the movements of the mobile station, which sends signals in a direction unforeknown to the adaptive array apparatus. One of the principles on which the adaptive array apparatus operates is MMSE (Minimum Mean Square Error). MMSE requires reference signals. A reference signal serves as a target when weighting received signals and combining them to produce a signal. An adaptive array apparatus that uses MMSE determines a weight vector so as to minimize a difference between the reference signal and the combined signal. Using such a weight vector creates a directivity pattern which is optimal for receiving signals from the mobile station.

In TDMA/TDD (Time Division Multiple Access/Time Division Duplex), which is another multiple access technique, each timeslot includes predetermined bit patterns such as a preamble and a unique word at the top and a payload in the following section.

This means that when a combination of SDMA, MMSE and TDMA/TDD is used in communication, the adaptive array apparatus can use the preamble, the unique word and the like as reference signals.

In more detail, the adaptive array apparatus sets a certain weight vector as an initial value, and compares a reference signal, such as a preamble and a unique word, with a signal that is obtained by weighting using the weight vector. In order to minimize the difference between them, the adaptive array apparatus adjusts the value of the weight vector. By repeating such processing for a bit pattern in symbol units, the weight vector converges on a certain value after a period of time. Following this, signals of the payload is weighted by the converged weight vector and then extracted. After receiving the predetermined bit pattern such as the preamble and the unique word, the adaptive array apparatus identifies the extracted signals and uses them as reference signals on the premise that the identification is correct.

However, the conventional adaptive array apparatus described above has problems in that a weight vector converges slowly and unstably. Here, converging unstable means that the value of a weight vector fluctuates and does not settle at a certain value. Converging slowly means that it takes long from the setting of an initial value of a weight vector to the convergence of the weight vector.

One reason is that in an algorithm of calculating weight vectors, stability in convergence is an element opposing to convergence speed. Therefore, it is difficult to improve both of them. For instance, in LMS (Least Mean Square), a typical algorithm for MMSE, increasing the speed of convergence leads to deterioration in convergence stability, whereas an improvement in stability slows the convergence.

Another reason is associated with the way of setting an initial value of a weight vector. Since the initial value is fixed in the conventional adaptive array apparatus, it takes long for the weight vector value to converge on an optimal value. In fact, in many cases weight vectors cannot converge sufficiently.

Figure 6A:
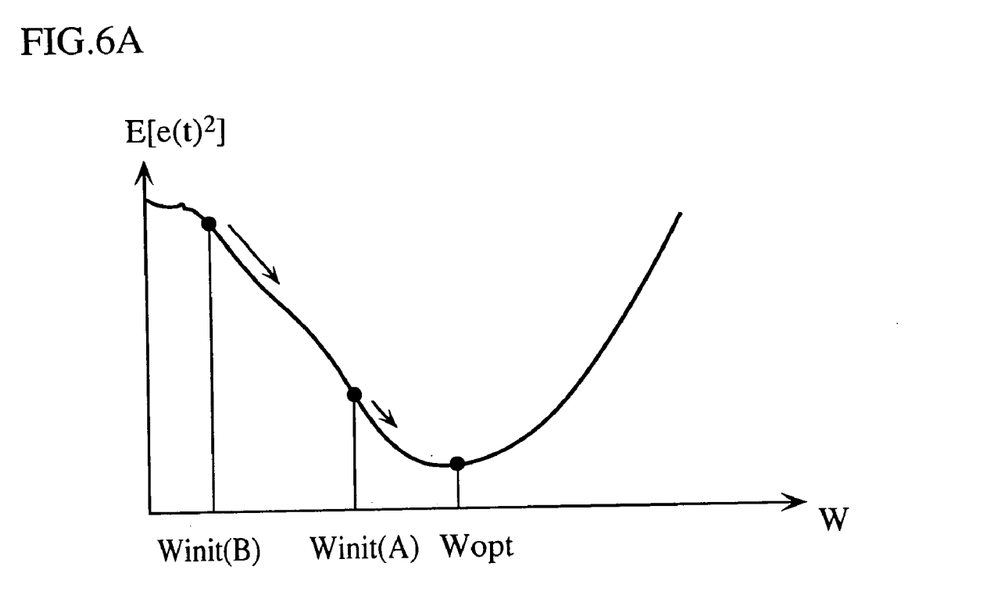
FIGS. 6A and 6B show difference curves.
Figure 6B:
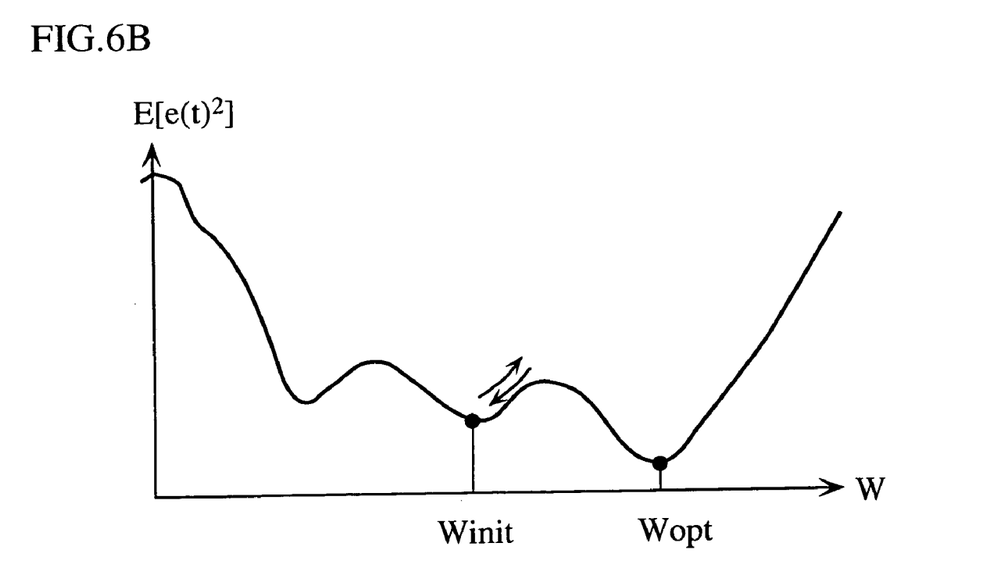

FIGS. 6A and 6B show difference curves. In the actual fact, a weight vector is multidimensional and so the difference curve has a curved surface in a multidimensional space, though the weight vector is illustrated as a one-dimensional vector here for the sake of convenience. In LMS algorithm and RLS (Recursive Least-Squares) algorithm which is also used for MMSE, the weight vector is adjusted consecutively in a direction that decreases the value of the difference curve.

As shown in FIG. 6A, it does not take long for an initial value Winit (A) to converge on an optimal value Wopt, as it is close to Wopt. In contrast, it takes long for an initial value Winit (B) to converge, as it is not close to Wopt. If only a single fixed initial value is used, it takes long for the initial value to converge, as it is not close to an optimal value.

If a weight vector calculated from the preceding symbol is set as an initial value, however, there is a high probability of the weight vector value being a local minimum value, because it is the point where the weight vector has finally settled as a result of an adjustment to minimize the difference.

As shown in FIG. 6B, it is known by experience that Winit may be a local minimum value due to noise or other factors. In that case, it is impossible for the weight vector value to pass a peak and converge on an optimal value Wopt which is a general minimum value.

The use of RLS can increase convergence speed, but when an error exists in signals at the beginning, the error is aggravated with successive calculations. This means that if there is a major error in a weight vector calculated from the last symbol, there is a danger that a totally wrong weight vector may be produced in the following reception period.

DISCLOSURE OF INVENTION

It is a first object of the present invention to provide an adaptive array apparatus, method and program that increase convergence stability and speed in the weight vector calculation, and thereby enable weight vectors to converge to optimal values, by making improvements to algorithms for calculating weight vectors.

It is a second object of the present invention to provide an adaptive array apparatus, method and program that enable weight vectors to converge to optimal values, and thereby increase convergence stability and speed of convergence in the weight vector calculation, by making improvements to a method for defining an initial weight vector value.

The first object can be achieved by an adaptive array apparatus which has a weight converge on an optimal value, by repeatedly adjusting the weight using predetermined calculations so as to minimize a difference between a desired signal and a signal which is weighted using the weight and combined, the adaptive array apparatus including: a judging unit for judging whether an adjusted weight is located closer to the optimal value than a reference value; and a changing unit for changing a first step size in accordance with the judgment result of the judging unit, the first step size being used to determine the extent to which the weight should be adjusted in the predetermined calculations.

Here, the adaptive array apparatus may have a plurality of antennas, wherein the judging unit judges that the adjusted weight is located closer to the optimal value than the reference value when the number of times the weight is adjusted reaches twice the number of antennas, and the changing unit changes the first step size from a first value to a second value when the adjusted weight is judged to be located closer to the optimal value than the reference value, the second value corresponding to a lower rate at which the weight is adjusted than the first value.

With the stated construction, it is possible to increase convergence speed and thus reduce the time required for a convergence by adjusting a weight vector at a higher rate, until the number of times the weight vector is adjusted reaches twice the number of the antennas. It is also possible to improve convergence stability by adjusting a weight vector at a lower rate, after the number of times the weight vector is adjusted reaches twice the number of the antennas.

Here, the judging unit may judge that the adjusted weight is located closer to the optimal value than the reference value when the difference between the combined signal and the desired signal becomes smaller than a predetermined value, wherein the changing unit changes the first step size from a first value to a second value when the adjusted weight is judged to be located closer to the optimal value than the reference value, the second value corresponding to a lower rate at which the weight is adjusted than the first value.

With the stated construction, it is possible to increase convergence speed and thus reduce the time required for a convergence by adjusting a weight vector at a higher rate, until the number of times the weight vector is adjusted reaches twice the number of the antennas. It is also possible to improve convergence stability by adjusting a weight vector at a lower rate, after the number of times the weight vector is adjusted reaches twice the number of the antennas.

Here, the judging unit may judge that the adjusted weight is located closer to the optimal value than the reference value when a frequency offset converges at a lower rate than a predetermined value, the frequency offset being adjusted successively, wherein the changing unit changes the first step size from a first value to a second value when the adjusted weight is judged to be located closer to the optimal value than the reference value, the second value corresponding to a lower rate at which the weight is adjusted than the first value.

With the stated construction, it is possible to increase convergence speed and thus reduce the time required for a convergence by adjusting a weight vector at a higher rate, until the number of times the weight vector is adjusted reaches twice the number of the antennas. It is also possible to improve convergence stability by adjusting a weight vector at a lower rate, after the number of times the weight vector is adjusted reaches twice the number of the antennas.

Here, the changing unit may also change a second step size from a third value to a fourth value, the second step size being used to determine the extent to which the frequency offset should be adjusted, the fourth value corresponding to a lower rate at which the frequency offset should be adjusted than the third value.

Here, the judging unit may judge that the adjusted weight is located closer to the optimal value than the reference value when a phase component of the difference becomes smaller than a phase component of the predetermined value.

The second object can be achieved by the adaptive array apparatus that further includes: a reception response vector calculating unit for calculating a reception response vector of an immediately preceding reception timeslot in a TDMA/TDD (Time Division Multiple Access/Time Division Duplex) reception and transmission cycle; a weight vector calculating unit for calculating a weight vector of the immediately preceding reception timeslot from the reception response vector; and an initial value setting unit for setting the weight vector of the immediately preceding reception timeslot, as an initial value for calculating a weight vector of a present reception timeslot.

As a result, the weight vector calculated from a Wiener solution of the preceding reception timeslot is set as an initial value of use in successive calculation of weight vectors, enabling the weight vector to converge on an optimal value in a short period of time.

Here, the adaptive array apparatus may include: a reception response vector calculating unit for calculating a reception response vector of an immediately preceding reception timeslot in the TDMA/TDD reception and transmission cycle; a correlation matrix calculating unit for calculating a correlation matrix from the reception response vector; and an initial value setting unit for setting the correlation matrix as an initial value for calculating a weight vector of a present reception timeslot.

As a result, the correlation matrix with a fewer error elements in the preceding reception frame is set as an initial value of use in successive calculation of weight vectors, enabling the weight vector to converge on an optimal value in a short period of time.

Here, the initial value setting unit may set an adjusted correlation matrix as an initial value instead of the correlation matrix, the adjusted correlation matrix being obtained by adding a predetermined value to diagonal elements of the correlation matrix.

As a result, a predetermined value is added to the diagonal elements of the correlation matrix, enhancing the convergency of a weight vector.

BEST MODE FOR CARRYING OUT THE INVENTION

The following describes an embodiment of the present invention, with reference to the accompanying drawings.

Construction of Wireless Base Station 100

Figure 1:
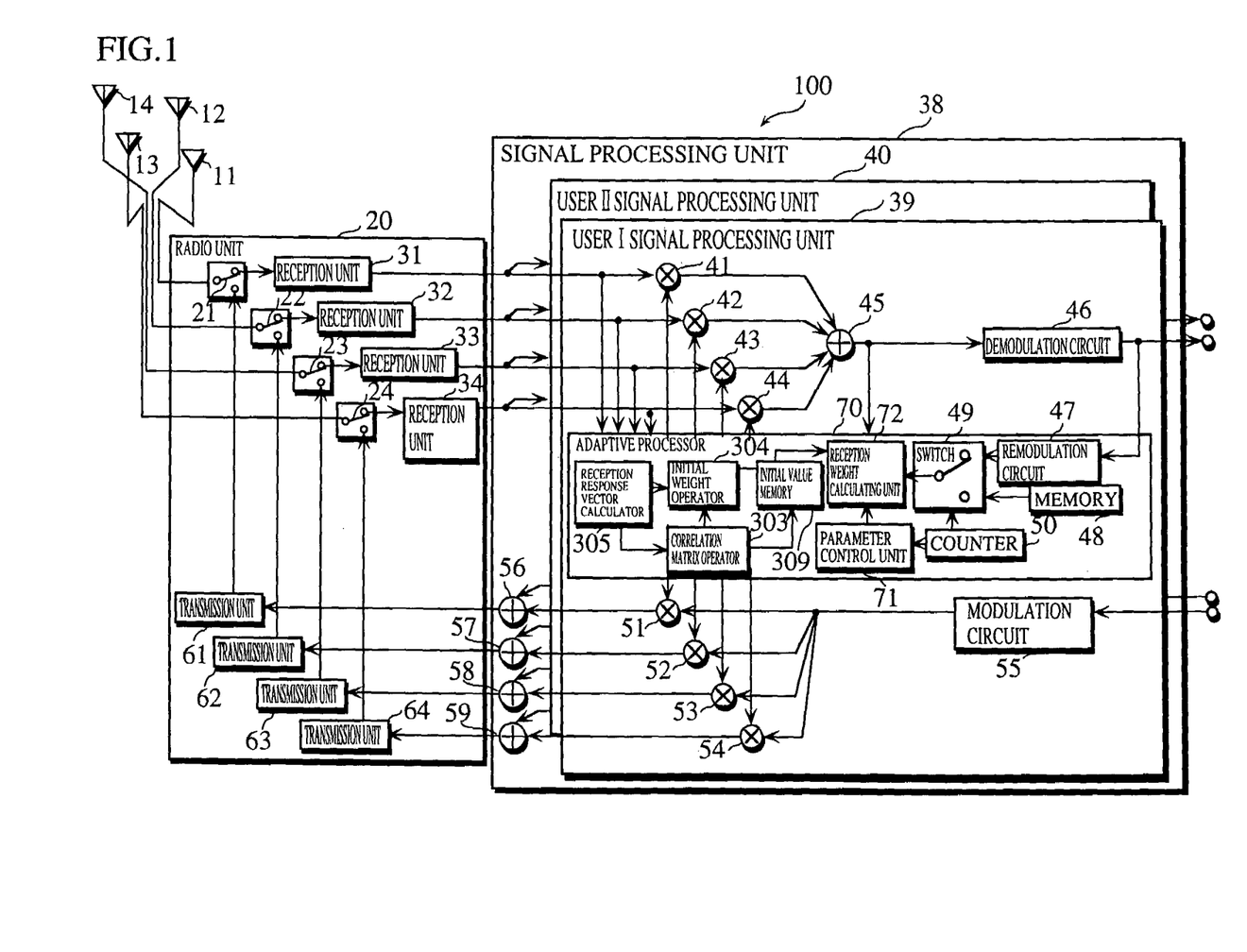
FIG. 1 is a block diagram showing the construction of a wireless base station (which is a main part of an adaptive array apparatus).

FIG. 1 is a block diagram showing a main part of a wireless base station 100 corresponding to an adaptive array apparatus.

As shown in FIG. 1, the wireless base station 100 includes antennas 11 to 14, a radio unit 20 and a signal processing unit 38.

The radio unit 20 includes switching units 21 to 24 for switching reception and transmission, and reception units 31 to 34 for converting high-frequency signals, which are sent from the antennas 11 to 14, into low-frequency signals and outputting them to the signal processing unit 38. The radio unit 20 further includes transmission units 61 to 64 for converting low-frequency signals that are input from the signal processing unit 38 into high-frequency signals, and amplifying and outputting them to the antennas 11 to 14.

The signal processing unit 38 is chiefly composed of a programmable digital signal processor, and performs signal processing on signals that travel between the wireless base station 100 and each mobile station, with which the wireless base station 100 performs multiplex communication using TDMA/TDD and SDMA.

Figure 2:
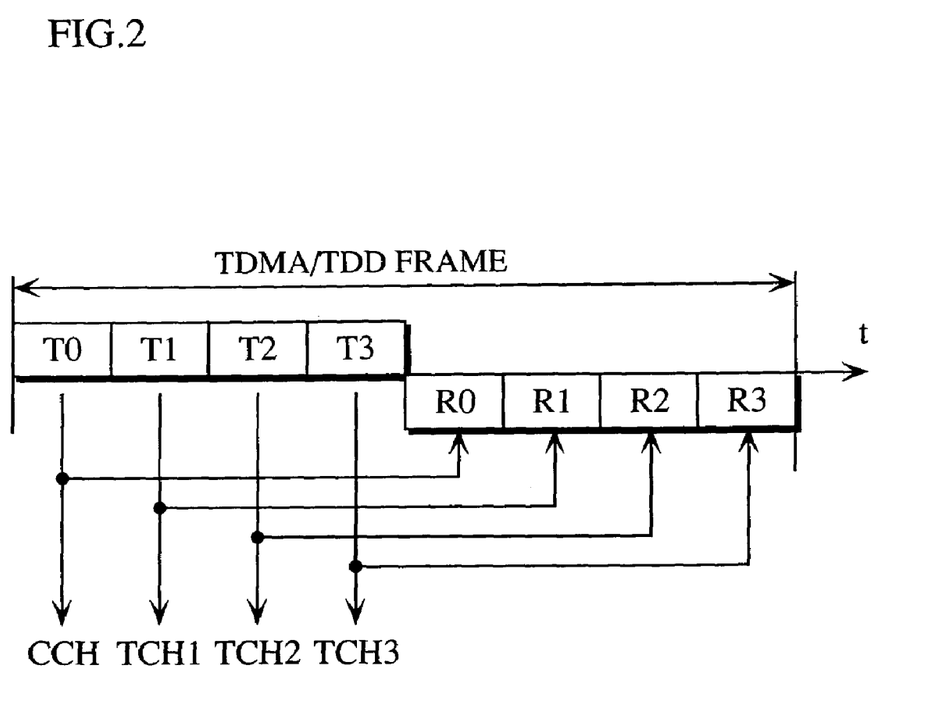
FIG. 2 is a schematic diagram of a TDMA/TDD frame.

The following is an explanation of the multiplex communication, with reference to FIG. 2.

FIG. 2 shows a TDMA/TDD frame of 5 ms taken along a time axis, which is a unit of a transmission and reception cycle. The TDMA/TDD frame consists of four transmission timeslots (T0 to T3) and four reception timeslots (R0 to R3), which are each 625 µs long. With this construction, the wireless base station 100 can compress 5 ms of information to 625 µs of information and transmit them to a maximum of four mobile stations in each of the timeslots T0 to T3. In each reception timeslot that comes 2.5 ms after the corresponding transmission timeslot, the wireless base station 100 receives from each mobile station 5 ms of information that has been compressed into 625 µs of information. In addition, the wireless base station 100 performs spatial multiplexing for two mobile stations in each timeslot using the adaptive array method. Thus, the use of TDMA/TDD and SDMA enables the wireless base station 100 to perform spatial multiplexing for a plurality of mobile stations. For instance, the wireless base station 100 communicates with first and second mobile stations in the transmission timeslot T0 and reception timeslot R0, and communicates with third and fourth mobile stations in the transmission timeslot T1 and reception timeslot R1.

The signal processing unit 38 realizes such multiplex communication, and processes reception/transmission signals for two mobile stations in each timeslot of a TDMA/TDD frame.

Detailed Construction of the Signal Processing Unit 38

FIG. 1 shows the construction of the signal processing unit 38 in terms of function. The signal processing unit 38 includes a user I signal processing unit 39, a user II signal processing unit 40 and adders 56 to 59.

The user I signal processing unit 39, in a reception timeslot, weights four signals input from the reception units 31 to 34 with predetermined weight signals, and thereby extracts signals sent from a mobile station to the wireless base station 100. In a transmission timeslot that comes 2.5 ms after that reception timeslot, the user I signal processing unit 39 adds weights to signals that are to be transmitted from the wireless base station 100 to the mobile station with the same weight signals, and then distributes the weighted signals to the transmission units 61 to 64, which outputs the weighted signals. More detailed explanation of their operation will be given later.

The user II signal processing unit 40 carries out the same processing as the user I signal processing unit 39 on a mobile station, which is different from a mobile station that the processing of the user I signal processing unit 39 is dealing with.

The adders 56 to 59, in a transmission timeslot, each add signals that are output from the user I signal processing unit 39 and user II signal processing unit 40 respectively, and output the results to the corresponding transmission units 61 to 64.

Detailed Construction of the User I Signal Processing Unit 39

The user I signal processing unit 39 includes multipliers 41 to 44, an adder 45, a demodulation circuit 46, an adaptive processor 70, a modulation circuit 55 and multipliers 51 to 54.

The multipliers 41 to 44 and the adder 45, in a reception timeslot, weight and combine each signal sent from the corresponding reception units 31 to 34 with particular weight signals calculated by a reception weight calculating unit 72.

The demodulation circuit 46 demodulates the combined symbol waved signals sent from the adder 45 and outputs the resulting bit data sequence.

The modulation circuit 55 modulates a bit data sequence to be transmitted in a transmission timeslot into a symbol waved signals.

The multipliers 51 to 54 multiply the modulated signals provided by the modulation circuit 55 by weight signals, and output the results. These weight signals have the same values as those calculated in a preceding reception timeslot.

The adaptive processor 70 is a primary construction element of the present invention, and provides a weight signal to each of the multipliers 41 to 44 in a reception timeslot while adjusting the weight signal so as to minimize a difference between a reference signal and the weight signal which is obtained through weighting and combining performed by the multipliers 41 to 44 and the adder 45. In a transmission timeslot, the adaptive processor 70 provides a weight signal, calculated in a reception timeslot that comes 2.5 ms earlier, to the multipliers 51 to 54.

Note that the reference signal is used as a target when weighting and combining received signals. In the first half of a reception timeslot, a sequence of given signals transmitted from a mobile station, such as a preamble and unique word, serves as reference signals. In the second half, a sequence of signals demodulated by the demodulation circuit 46 from combined signals serves as reference signals.

Detailed Construction of the Adaptive Processor 70

The adaptive processor 70 includes a remodulation circuit 47, a memory 48, a switch 49, a counter 50, a parameter control unit 71, the reception weight calculating unit 72, a correlation matrix operator 303, an initial weight operator 304, a reception response vector calculator 305 and an initial value memory 309.

The remodulation circuit 47 remodulates a bit data sequence sent from the demodulation circuit 46 into symbol waved signals, and outputs them to the switch 49. These signals are used as reference signals by the reception weight calculating unit 72 to calculate weight signals.

The memory 48 stores given bit patterns such as a preamble and unique word, and outputs a symbol waved signals of the bit pattern through the switch 49. Under the PHS(Personal Handyphone System) standard, other given bit pattern includes a rampbit and a start symbol. The memory 48 stores a part or all of those given bit patterns and outputs their symbol waved signals. Such signals are also used as reference signals by the reception weight calculating unit 72.

The counter 50 counts the number of symbols in a symbol waved signal that is sent from the remodulation circuit 47 or the memory 48 to the switch 49.

The switch 49 uses the number of symbols to distinguish a reception period for a given bit pattern from a reception period for the remaining signals contained in a reception timeslot. The switch 49 selects an output from the memory 48 in the former period and an output from the remodulation circuit 47 in the latter period, and then outputs a selected output to the reception weight calculating unit 72.

The parameter control unit 71 adjusts a parameter that is used to determine a rate of adjusting a weight signal, according to the extent at which the weight signal converges on an ideal weight signal after successive modification. More detailed explanation of such modifications will be given later.

The reception weight calculating unit 72 calculates weight signals to provide to the multipliers 41 to 44 and multipliers 51 to 54. More specifically, in a reception period of a reception timeslot where a given bit pattern is received, initial weight signal values stored in the initial value memory 309 are provided to the multipliers 41 to 44, respectively. Then, combined signals, which is obtained by weighting and combining by the multipliers 41 to 44 and the adder 45, are input to the reception weight calculating unit 72. The reception weight calculating unit 72 calculates a difference between each of the combined signals and a respective reference signal which has been provided by the memory 48 through the switch 49. The reception weight calculating unit 72 adjusts the initial weight signal so as to minimize the difference, calculates a new weight signal and sends it to the multiplier again. By repeatedly adjusting the weight signal in a specific period of time, around the time the reception of the given bit pattern is completed, a weight signal has converged nearly on an ideal value. After the reception is completed, the reception weight calculating unit 72 calculates a difference between the combined signal and the reference signal which is input from the remodulation circuit 47 through the switch 49, and makes precise adjustment for the weight signal on the basis of the difference.

Calculation of an Initial Value

The reception response vector calculator 305 calculates an ensemble average of a product of reception signals and user signals contained in the entire reception frame. Reception response vectors are calculated using the following expressions, where a reception response vector calculated from a signal S1, which is sent from a first mobile station (hereafter referred to as a user I), is RV1 and a reception response vector calculated from a signal S2, which is sent from a second mobile station (hereafter referred to as a user II), is RV2;

$RV1=[RV_{11}, RV_{12}, RV_{13}, RV_{14}]^T$
$RV2=[RV_{21}, RV_{22}, RV_{23}, RV_{24}]^T$
$RV_{11}=E[X_1(t)S1^*(t)]$
$RV_{12}=E[X_2(t)S1^*(t)]$
$RV_{13}=E[X_3(t)S1^*(t)]$
$RV_{14}=E[X_4(t)S1^*(t)]$
$RV_{21}=E[X_1(t)S2^*(t)]$
$RV_{22}=E[X_2(t)S2^*(t)]$
$RV_{23}=E[X_3(t)S2^*(t)]$
$RV_{24}=E[X_4(t)S2^*(t)]$ here E [ ] shows an expected value, * indicates conjugate and $^T$ indicates transpose.

RV1 is calculated by the user I signal processing unit 39 and RV2 is calculated by the user II signal processing unit 40. The resulting values provided by any one of the units are sent to the other and shared between the two units.

The initial value memory 309 stores an initial value P(0) of a correlation matrix calculated by the correlation matrix operator 303 and an initial value W(0) of a weight vector calculated by the initial weight operator 304.

A reference signal memory 310 stores a reference signal d(t).

The correlation matrix operator 303 calculates an initial value P(0) of a correlation matrix by applying reception response vectors RV1 and RV2 of a preceding frame to the following expressions, and stores the results in the initial value memory 309.

$P(0)=[p_{ij}](i, j=1~4)$
$p_{11}=RV_{11}^* \times RV_{11}+RV_{21}^* \times RV_{21}$
$p_{22}=RV_{12}^* \times RV_{12}+RV_{22}^* \times RV_{22}$
$p_{33}=RV_{13}^* \times RV_{13}+RV_{23}^* \times RV_{23}$
$p_{44}=RV_{14}^* \times RV_{14}+RV_{24}^* \times RV_{24}$
$p_{12}=RV_{11}^* \times RV_{12}+RV_{21}^* \times RV_{22}$
$p_{13}=RV_{11}^* \times RV_{13}+RV_{21}^* \times RV_{23}$
$p_{14}=RV_{11}^* \times RV_{14}+RV_{21}^* \times RV_{24}$
$p_{23}=RV_{12}^* \times RV_{13}+RV_{22}^* \times RV_{23}$
$p_{24}=RV_{12}^* \times RV_{14}+RV_{22}^* \times RV_{24}$
$p_{34}=RV_{13}^* \times RV_{14}+RV_{22}^* \times RV_{24}$
$p_{ij}=p_{ij}^*(i \neq j)$ The initial weight operator 304 calculates an initial value W(0) of a weight vector by applying the reception response vector RV1 of the preceding frame and the initial value P(0) of the correlation matrix to the following expression, $W(0)=P(0)^{-1}RV1$ and stores the result in the initial value memory 309.

Using such calculated initial values of a weight vector and correlation matrix gives the following advantages;

(1) Since little change is expected between the preceding frame and the present frame, using the initial values of the weight vector and the correlation matrix, which are calculated from the preceding frame, can reduce the time required for the weight vector to converge on an optimal value.

(2) A weight vector is calculated from a Wiener solution based on reception response vectors contained in the entire frame, not just the last symbol of the preceding frame. Unlike a weight vector calculated only from the last symbol, such a weight vector is not a local minimum value and so converges on an optimal weight value.

(3) For the weight vector and correlation matrix calculated from a Wiener solution of the preceding frame, there is only a small difference between an initial weight signal value and a reference signal, with a factor of the difference being leveled off. This being so, RLS algorithm can be used as a weight calculating means, though it is difficult to apply when there is a large difference between an initial weight signal value and an optimal value. With the use of RLS, the convergence speed of a weight vector increases, and thereby the time required for the convergence is reduced.

The reception weight calculating unit 72 calculates a reception weight vector using LMS and RLS, and adjusts the reception weight vector in each reception timeslot by successively calculating new weight vectors. More specifically, the reception weight calculating unit 72 calculates weights Wrx1 to Wrx4 using sequences of symbols $X_1$ to $X_4$, which are sent from the radio unit 20, a sequence of symbols d(t), which are reference signals stored in the memory 48 or signals generated by the radio unit itself, and initial values W(0) and P(0), which are stored in the initial value memory 309. The reception weight calculating unit 72 then outputs the resulting weights Wrx1 to Wrx4.

The multipliers 41 to 44 and the adder 45 generate a user I signal S1 (=Wrx1×$X_1$+Wrx2×$X_2$+Wrx3×$X_3$+Wrx4×$X_4$), which is sent to a modem unit.

Operational Procedure for Calculating an Initial Value

The following describes how to calculate an initial value.

Figure 3:
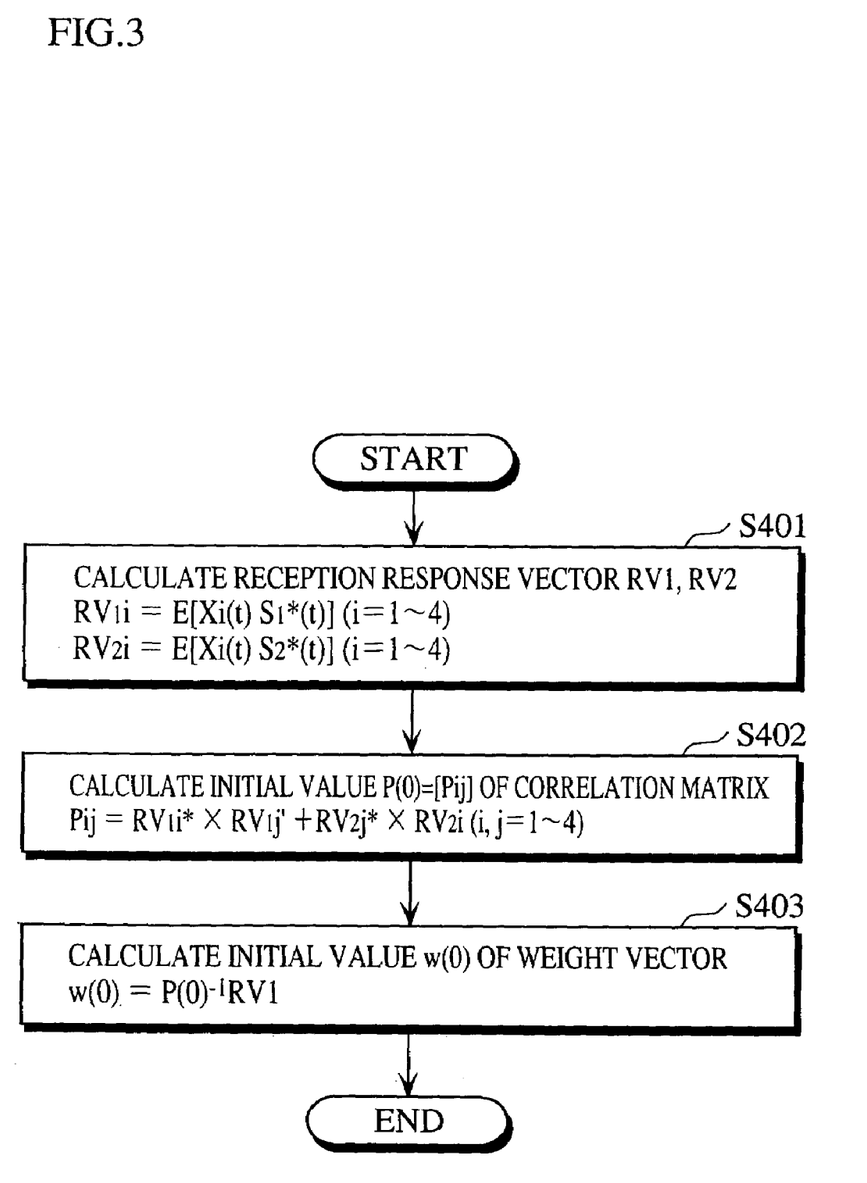
FIG. 3 is a flowchart showing an operational procedure for calculating an initial value by a signal processing unit.

FIG. 3 is a flowchart showing the operational procedure for calculating an initial value by the signal processing unit 38.

First, after a user signal S(t) is calculated from the last reception signal X(t) of a reception frame, the reception response vector calculator 305 calculates reception response vectors RV1=$[RV_{11}, RV_{12}, RV_{13}, RV_{14}]^T$ and RV2=$[RV_{21}, RV_{22}, RV_{23}, RV_{24}]^T$ using the ensemble average of a product of the reception signal X(t) and user signal S(t). In other words, $RV_{1i}=E[X_i(t)S1^*(t)]$, $RV_{2i}=E[X_i(t)S2^*(t)]$ (step S401).

Secondly, the correlation matrix operator 303 calculates an initial value P(0) of a correlation matrix from the reception response vectors RV1 and RV2, and stores it in the initial value memory 309. Therefore, when P(0)=$[p_{ij}]$ (i, j=1~4), $p_{ij}=RV_{1i}^* \times RV_{1j}+RV_{2i}^* \times RV_{2j}$ (step S402).

Finally, the initial weight operator 304 calculates an initial value W(0) of a weight vector. That is, an initial value of a weight vector in the user I signal processing unit is calculated by the expression, W(0)=$P(0)^{-1}$RV1 (step S403).

Operational Procedure for Calculating a Weight Signal

Figure 4:
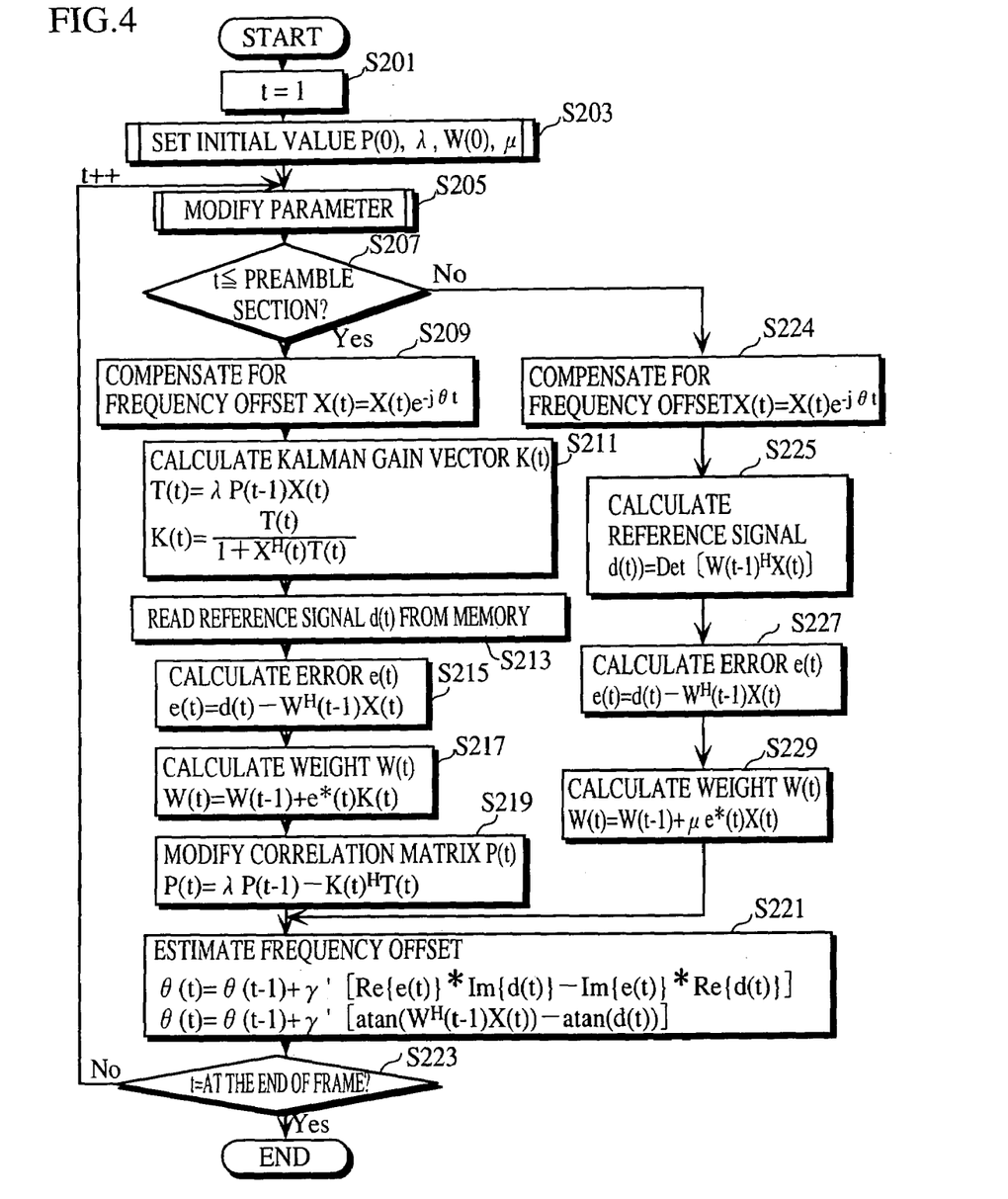
FIG. 4 is a flowchart showing an operational procedure for calculating a weight vector by a weight calculating unit.

FIG. 4 is a flowchart showing the detailed procedure for calculating a weight signal, centering on the reception weight calculating unit 72. The reception weight calculating unit 72 and other units perform the processing described in FIG. 4 in each timeslot.

When a reception timeslot begins, the reception weight calculating unit 72 sets the time at t=1 (step S201) and sets an initial value (step S203). To set the initial value, an initial value W(0) of a weight vector and an initial value P(0) of a correlation matrix are read from the initial value memory 309, and a forgetting coefficient λ and a step size μ are read from a memory situated inside the reception weight calculating unit 72.

After step S205, the weight vector is repeatedly adjusted in symbol units, starting from t=1 till t reaches the end of the timeslot.

The reception weight calculating unit 72 has the parameter control unit 71 execute processing of adjusting parameters (step S205). More detailed explanation of this processing will be given later.

While t is within a preamble section, the reception weight calculating unit 72 adjusts the weight vector using expressions that are based on RLS (Recursive Least Squares) algorithm (steps S 209 to S219). After the preamble section, the reception weight calculating unit 72 adjusts the weight vector using expressions that are based on LMS algorithm (steps S 225 to S 229). Note that the preamble section here refers to a period for receiving the given bit pattern such as a unique word.

In step S207, the reception weight calculating unit 72 compensates for frequency offset while t is within the preamble section (step S209). Put another way, X(t)$e^{-j\theta t}$ is determined and regarded as being X(t).

Then, the reception weight calculating unit 72 calculates a Kalman gain vector K(t) (step S211). More specifically, the reception weight calculating unit 72 calculates T(t)=λP(t−1)X(t), and based on that, calculates K(t)=T(t)/(1+$X^H$(t) T(t)). $^H$ refers to conjugate transpose. When t=1, P(0) is read from the initial value memory 309 and used as a reference signal.

The reception weight calculating unit 72 reads a reference signal d(t) for the preamble section from the memory 48 (step S213) and calculates an error e(t)=d(t)−$W^H$(t−1)X(t) (step S215). When t=1, W(0) is read from the initial value memory 309 and used as a reference signal.

The reception weight calculating unit 72 adjusts the weight vector (step S217), by performing the calculation W(t)=W(t−1)+e*(t)K(t).

The reception weight calculating unit 72 adjusts the correlation matrix P(t) (step S219), by performing the calculation P(t)=λP(t−1)−K(t)$^H$T(t).

During the preamble section, the reception weight calculating unit 72 carries out the processing described in steps S209 through 219. After that, the reception weight calculating unit 72 estimates frequency offset θ(t) (step S223). To do so, either of the following expressions θ(t)=θ(t−1)+γ'[Re{e(t)}*Im{d(t)}−Im{e(t)}*Re{d(t)}] or θ(t)=θ(t−1)+γ'[a tan($W^H$(t−1)X(t))−a tan(d (t))]

is used.

The reception weight calculating unit 72 ends the series of processing if t has reached the end of the reception timeslot, and if not, repeats the processing from step S205 (step S203).

When t passes the preamble section and goes beyond, since any reference signals are stored in the memory 48 for the following section, the reception weight calculating unit 72 begins to generate reference signals on its own. Which is to say, the reception weight calculating unit 72 either calculates a reference signal, d(t)=De t [W(t−1)$^H$X(t)] (step S225) or employs a signal sent from the remodulation circuit 47 as a reference signal d(t).

Then, the reception weight calculating unit 72 calculates an error, e(t)=d(t)−$W^H$(t−1) X(t) (step S227).

The reception weight calculating unit 72 then adjusts the weight vector, by performing the calculation, W(t)=W(t−1)+μe*(t)X(t) (step S229).

Finally, the reception weight calculating unit 72 performs step S221, repeats the processing from step S205 and ends the processing when t reaches the end of a reception timeslot (step S223).

Such frequency offset processing may be saved after step S219, and performed only after step S229.

Modification of a Parameter

In step S205, the parameter control unit 71 adjusts a parameter that determines to which extent a weight vector should be adjusted, depending on whether the adjusted weight vector is located closer to an optimal weight vector than a reference value as a result of the processing from steps S207 through 223.

There are five methods for the modification 1 to 5, as described below, in respect of how to judge the extent of convergence and which kind of parameter is to be adjusted.

The parameter control unit 71 carriers out one of the adjusting methods 1 to 5. Any combination of these methods may also be used.

Adjusting Method 1

The parameter control unit 71 judges that an adjusted weight is located closer to an optimal value than a reference value when the number of times a weight vector is adjusted, t, reaches twice the number of antennas, which is 4 antennas×2=8. The parameter control unit 71 then changes an initial value of at least one of the forgetting coefficient $\lambda$, step size $\mu$ and frequency offset step size $\gamma$, so that the weight vector is adjusted at a lower rate. This means that an initial value of the forgetting coefficient $\lambda$ is raised, while initial values of the step size $\mu$ and frequency offset step size $\gamma$ are decreased.

Being adjusted successively, a weight vector in theory converges to some extent by the time the number of times it is adjusted reaches twice the number of antennas. Accordingly, when the number of times the weight vector is adjusted reaches twice the number of antennas, by adjusting one of the parameters so that the weight vector is adjusted at a lower rate, both the convergence speed and stability can be enhanced. Which is to say, the time required for the convergence can be reduced with an increase in the convergence speed, by adjusting the weight vector at a higher rate when the number of times the weight vector is adjusted is smaller than twice the number of antennas. Also, the convergence stability can be improved by lowering the rate at which the weight vector is adjusted when the number of times the weight vector is adjusted is greater than twice the number of antennas.

Adjusting Method 2

The parameter control unit 71 judges that an adjusted weight is located closer to an optimal value than a reference value when a phase error of an error e(t) becomes smaller than a predetermined value stored in the memory. At that time, the parameter control unit 71 changes an initial value of at least one of the forgetting coefficient $\lambda$, step size $\mu$ and frequency offset step size $\gamma$, so that the weight vector is adjusted at a lower rate. Note that the phase error refers to a difference between a phase component of a reference signal d(t) and a phase component of a combined signal $W^H(t-1)X(t)$, and that the error e(t) is calculated in step S215 or step S227. As a result, when the phase error becomes greater than a predetermined value, the time required for convergence can be reduced with an increase in the convergence speed, and when the phase error becomes smaller than the predetermined value, the convergence stability can be enhanced with a fall in the rate at which the weight vector is adjusted.

Adjusting Method 3

The parameter control unit 71 judges that an adjusted weight is located closer to an optimal value than a reference value when an error e(t) becomes smaller than a predetermined value stored in the memory. At that time, the parameter control unit 71 changes an initial value of at least one of the forgetting coefficient $\lambda$, step size $\mu$ and frequency offset step size $\gamma$, so that the weight vector is adjusted at a lower rate. Here, the error e(t) is calculated in step S215 or step S227. This being so, when the error e(t) is greater than a predetermined value, the time required for convergence can be reduced with an increase in the convergence speed, and when the error e(t) is smaller than the predetermined value, the convergence stability can be improved with a fall in the rate at which the weight vector is adjusted.

Adjusting Method 4

The parameter control unit 71 judges that an adjusted weight is not located closer to an optimal value than a reference value when a phase error of an error e(t) becomes greater than a predetermined value stored in the memory. At that time, the parameter control unit 71 changes an initial value of at least one of the forgetting coefficient $\lambda$, step size $\mu$ and frequency offset step size $\gamma$, so that the weight vector is adjusted at a higher rate. Note that the phase error refers to a difference between a phase component of a reference signal d(t) and a phase component of a combined signal $W^H(t-1)X(t)$, and that the error e(t) is calculated in step S215 or step S227.

Adjusting Method 5

The parameter control unit 71 judges that an adjusted value is not located closer to an optimal value than a reference value when an error e(t) becomes greater than a predetermined value stored in the memory. At that time, the parameter control unit 71 changes an initial value of at least one of the forgetting coefficient $\lambda$, step size $\mu$ and frequency offset step size $\gamma$, so that the weight vector is adjusted at a higher rate. Here, the error e(t) is calculated in step S215 or step S227.

As described above, the wireless base station 100 in this embodiment uses a weight vector and a correlation matrix, which are obtained from a reception response vector of the preceding reception frame, as an initial value to adjust the weight vector, so that the adjusted weight vector converges on an optimal value in a shorter period of time. Also, the parameter control unit 71 adjusts parameters in accordance with how closer is an adjusted weight located, as described earlier, so that the weight vector converges on an optimal value in a shorter period of time without experiencing diffusion.

Modifications

Though the adaptive array apparatus of the present invention has been described based on the above embodiments, the invention should not be limited to such. For example, the following modifications are possible.

(1) Initial Value

In the above embodiments, initial values of both a correlation matrix and a weight vector are calculated, but either of them may be used single. For instance, only an initial value of the weight vector may be calculated as described above while using an identity unit multiplied by a particular constant as an initial value of the correlation matrix, which is a conventional method. Likewise, only an initial value of the correlation matrix may be calculated as described above while using 0 vector as an initial value of the weight vector, which is a conventional method. This is applicable not only to an adaptive array apparatus that operates under the MMSE standard but also to other algorithms for successive weight estimation.

(2) Modification of an Initial Value of the Correlation Matrix

Figures 5A, 5B:
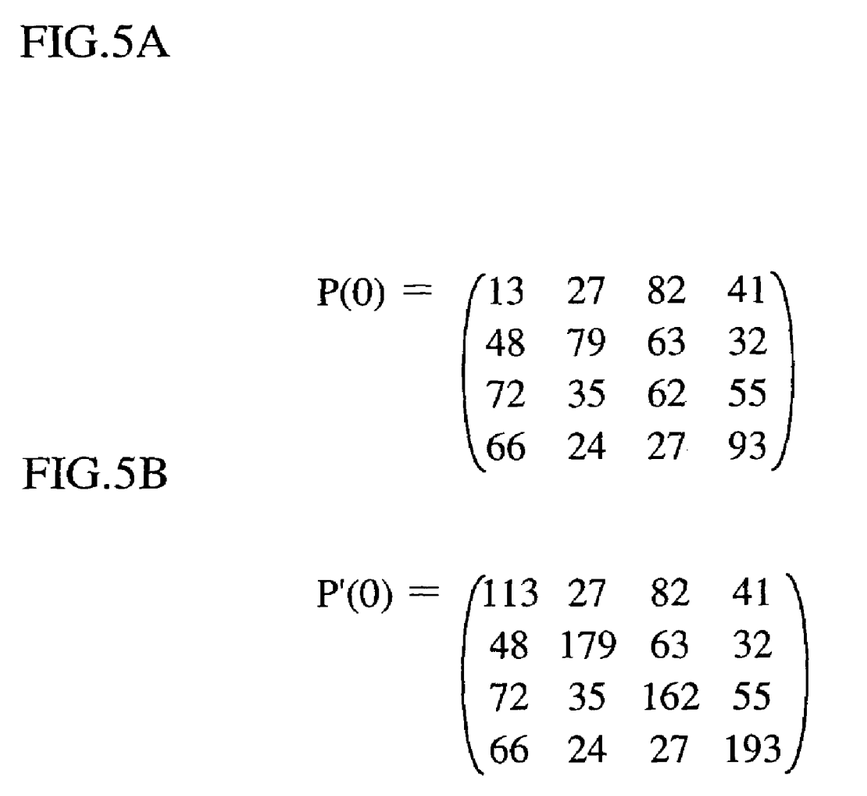
FIG. 5A shows an example initial value P(0) of a correlation matrix calculated by a correlation matrix operator 303.
FIG. 5B shows an initial value P'(0) of an adjusted version of the correlation matrix.

It is known by experience that the convergence of weight vectors can be further improved (the convergence will become more easily achieved) by adding a predetermined value to diagonal elements of an initial value of a correlation matrix calculated by the correlation matrix operator 303. An initial value of such adjusted correlation matrix may also be used.

FIG. 5A shows one example of an initial value P(0) of a correlation matrix calculated by the correlation matrix operator 303. FIG. 5B shows an initial value P'(0) of the adjusted correlation matrix. As shown in FIG. 5B, a predetermined value 100 is added to the diagonal elements $P_{11}$, $P_{22}$, $P_{33}$ and $P_{44}$ of P' (0).

(3) LMS and RLS

Though RLS algorithm is used to calculate a weight vector in the preamble section and LMS algorithm is used in the section following the preamble section in the above embodiment, the invention should not be limited to such. For instance, either RLS or LMS algorithm may be used single throughout a timeslot to calculate a weight vector. Using RLS algorithm throughout a timeslot to calculate a weight vector can be achieved by having reference signals generated, as in the case of the LMS algorithm, instead of reading pre-stored reference signals from the reference signal memory.

(4) Calculation of a Reception Response Vector

Though an ensemble average of a product of reception signals and user signals in the entire reception frame is used as a reception response vector in the above embodiment, the invention should not be limited to such. An ensemble average in a particular section, for example in the preamble section, may be used as a reception response vector. Also, the method for calculating a response vector should not be limited to such.

INDUSTRIAL APPLICABILITY

The adaptive array apparatus of the present invention is suitable for a communication unit of a base station in a communication system.

The invention claimed is:

1. An adaptive array apparatus that causes a weight to converge on an optimal value, by repeatedly adjusting the weight using predetermined calculations so as to minimize a difference between a desired signal and a signal which is weighted using the weight, the adaptive array apparatus comprising:

judging means for judging whether an adjusted weight is located closer to the optimal value than a reference value, wherein the judging means judges that the adjusted weight is located closer to the optimal value than the reference value when the difference between the weighted signal and the desired signal becomes smaller than a predetermined value; and changing means for changing a first step size in accordance with the judgment result of the judging means, the first step size being used to determine an extent to which the weight should be adjusted in the predetermined calculations, wherein the changing means changes the first step size from a first value to a second value when the adjusted weight is judged to be located closer to the optimal value than the reference value, the second value corresponding to a lower rate at which the weight is adjusted than the first value.

2. An adaptive array apparatus that causes a weight to converge on an optimal value, by repeatedly adjusting the weight using predetermined calculations so as to minimize a difference between a desired signal and a signal which is weighted using the weight, the adaptive array apparatus comprising:

judging means for judging whether an adjusted weight is located closer to the optimal value than a reference value, wherein the judging means judges that the adjusted weight is located closer to the optimal value than the reference value when a frequency offset converges at a lower rate than a predetermined value, the frequency offset being adjusted successively; and changing means for changing a step size in accordance with the judgment result of the judging means, the step size being used to determine an extent to which the weight should be adjusted in the predetermined calculations, wherein the changing means changes the step size from a first value to a second value when the adjusted weight is judged to be located closer to the optimal value than the reference value, the second value corresponding to a lower rate at which the weight is adjusted than the first value.

3. The adaptive array apparatus of claim 1, wherein the changing means also changes a second step size from a third value to a fourth value, the second step size being used to determine an extent to which the frequency offset should be adjusted, the fourth value corresponding to a lower rate at which the frequency offset should be adjusted than the third value.

4. The adaptive array apparatus of claim 1, wherein the judging means judges that the adjusted weight is located closer to the optimal value than the reference value when a phase component of the difference becomes smaller than a phase component of the predetermined value.

5. The adaptive array apparatus of claim 1, further comprising:

reception response vector calculating means for calculating a reception response vector of an immediately preceding reception timeslot in a TDMA/TDD (Time Division Multiple Access/Time Division Duplex) reception and transmission cycle;

weight vector calculating means for calculating a weight vector of the immediately preceding reception timeslot from the reception response vector; and initial value setting means for setting the weight vector of the immediately preceding reception timeslot, as an initial value for calculating a weight vector of a present reception timeslot.

6. The adaptive array apparatus of claim 1, further comprising:

reception response vector calculating means for calculating a reception response vector of an immediately preceding reception timeslot in a TDMA/TDD reception and transmission cycle;

correlation matrix calculating means for calculating a correlation matrix from the reception response vector; and initial value setting means for setting the correlation matrix as an initial value for calculating a weight vector of a present reception timeslot.

7. The adaptive array apparatus of Claim 6, further comprising:

weight vector calculating means for calculating a weight vector of the immediately preceding reception timeslot, based on the reception response vector, wherein the initial value setting means also sets the weight vector of the immediately preceding reception timeslot as an initial value for calculating the weight vector of the present reception timeslot.

8. The adaptive array apparatus of Claim 6, wherein the initial value setting means sets an adjusted correlation matrix as an initial value instead of the correlation matrix, the adjusted correlation matrix being obtained by adding a predetermined value to diagonal elements of the correlation matrix.

9. The adaptive array apparatus of Claim 7,
wherein the initial value setting means sets an adjusted correlation matrix as an initial value instead of the correlation matrix, the adjusted correlation matrix being obtained by adding a predetermined value to diagonal elements of the correlation matrix.

10. An adaptive array method used in an adaptive array apparatus that causes a weight to converge on an optimal value, by repeatedly adjusting the weight using predetermined calculations so as to minimize a difference between a desired signal and a signal which is weighted using the weight, the adaptive array method comprising:
   a reception response vector calculating step for calculating a reception response vector of an immediately preceding reception timeslot in a TDMA/TDD (Time Division Multiple Access/Time Division Duplex) reception and transmission cycle;
   a weight vector calculating step for calculating a weight vector of the immediately preceding reception timeslot from the reception response vector;
   an initial value setting step for setting the weight vector of the immediately preceding reception timeslot, as an initial value for calculating a weight vector of a present reception timeslot;
   a judging step for judging whether an adjusted weight is located closer to the optimal value than a reference value; and
   a changing step for changing a step size in accordance with the judgment result of the judging step, the step size being used to determine an extent to which the weight should be adjusted in the predetermined calculations.

11. An adaptive array method used in an adaptive array apparatus that causes a weight to converge on an optimal value, by repeatedly adjusting the weight using predetermined calculations so as to minimize a difference between a desired signal and a signal which is weighted using the weight, the adaptive array method comprising:
   a reception response vector calculating step for calculating a reception response vector of an immediately preceding reception timeslot in a TDMA/TDD (Time Division Multiple Access/Time Division Duplex) reception and transmission cycle;
   a correlation matrix calculating step for calculating a correlation matrix from the reception response vector;
   an initial value setting step for setting the correlation matrix as an initial value for calculating a weight vector of a present reception timeslot;
   a judging step for judging whether an adjusted weight is located closer to the optimal value than a reference value; and
   a changing step for changing a step size in accordance with the judgment result of the judging step, the step size being used to determine an extent to which the weight should be adjusted in the predetermined calculations.

12. A computer readable medium storing a program which when executed by a computer in an adaptive array apparatus causes a weight to converge on an optimal value, by repeatedly adjusting the weight using predetermined calculations so as to minimize a difference between a desired signal and a signal which is weighted using the weight, the program comprising:
   a reception response vector calculating step for calculating a reception response vector of an immediately preceding reception timeslot in a TDMA/TDD (Time Division Multiple Access/Time Division Duplex) reception and transmission cycle;
   a weight vector calculating step for calculating a weight vector of the immediately preceding reception timeslot from the reception response vector;
   an initial value setting step for setting the weight vector of the immediately preceding reception timeslot, as an initial value for calculating a weight vector of a present reception timeslot;
   a judging step for judging whether an adjusted weight is located closer to the optimal value than a reference value; and
   a changing step for changing a step size in accordance with the judgment result of the judging step, the step size being used to determine an extent to which the weight should be adjusted in the predetermined calculations.

13. A computer readable medium storing a program which when executed by a computer in an adaptive array apparatus causes a weight to converge on an optimal value, by repeatedly adjusting the weight using predetermined calculations so as to minimize a difference between a desired signal and a signal which is weighted using the weight, the program comprising:
   a reception response vector calculating step for calculating a reception response vector of an immediately preceding reception timeslot in a TDMA/TDD (Time Division Multiple Access/Time Division Duplex) reception and transmission cycle;
   a correlation matrix calculating step for calculating a correlation matrix from the reception response vector;
   an initial value setting step for setting the correlation matrix, as an initial value for calculating a weight vector of a present reception timeslot;
   a judging step for judging whether an adjusted weight is located closer to the optimal value than a reference value; and a changing step for changing a step size in accordance with the judgment result of the judging step, the step size being used to determine an extent to which the weight should be adjusted in the predetermined calculations.

14. An adaptive array apparatus that causes a weight to converge on an optimal value, by repeatedly adjusting the weight using predetermined calculations so as to minimize a difference between a desired signal and a signal which is weighted using the weight, the adaptive array apparatus comprising:
   judging means for judging, whether an adjusted weight is located closer to the optimal value than a reference value, wherein the judging means judges that the adjusted weight is located closer to the optimal value than the reference value when a number of times the weight is adjusted reaches twice a number of antennas; and
   changing means for changing a first step size in accordance with the judgment result of the judging means, the first step size being used to determine an extent to which the weight should be adjusted in the predetermined calculations, wherein when the adjusted weight is judged to be located closer to the optimal value than the reference value, the changing means (a) changes the first step size from a first value to a second value, the second value corresponding to a lower rate at which the weight is adjusted than the first value, and (b) changes a second step size from a third value to a fourth value, the second step size being used to determine an extent to which a frequency offset should be adjusted, the fourth value corresponding to a lower rate at which the frequency offset should be adjusted than the third value.

* * * * *